(12) United States Patent
Gollub et al.

(10) Patent No.: US 7,870,441 B2
(45) Date of Patent: Jan. 11, 2011

(54) DETERMINING AN UNDERLYING CAUSE FOR ERRORS DETECTED IN A DATA PROCESSING SYSTEM

(75) Inventors: Marc A. Gollub, Roundrock, TX (US); Chuon W. Liu, Rego Park, NY (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 12/050,608

(22) Filed: Mar. 18, 2008

(65) Prior Publication Data

US 2009/0240990 A1 Sep. 24, 2009

(51) Int. Cl.
*G06F 11/00* (2006.01)
(52) U.S. Cl. .......................... 714/48; 714/45
(58) Field of Classification Search ............... 714/45, 714/46, 47, 48, 57, 2
See application file for complete search history.

(56) References Cited

U.S. PATENT DOCUMENTS

| 3,775,598 | A | 11/1973 | Chao et al. |
| 4,862,399 | A | 8/1989 | Freeman |
| 4,996,659 | A | 2/1991 | Yamaguchi et al. |
| 5,184,308 | A | 2/1993 | Nagai et al. |
| 5,475,624 | A | 12/1995 | West |
| 6,032,269 | A | 2/2000 | Renner, Jr. |
| 6,202,173 | B1 | 3/2001 | Hollett et al. |
| 6,684,344 | B1 * | 1/2004 | Kawasaki ............ 714/8 |
| 6,990,424 | B2 | 1/2006 | Clegg et al. |
| 2002/0053045 | A1 | 5/2002 | Gillenwater et al. |
| 2006/0100972 | A1 * | 5/2006 | Chianese et al. ......... 707/1 |
| 2006/0288260 | A1 * | 12/2006 | Xiao et al. ............ 714/48 |
| 2007/0014614 | A1 * | 1/2007 | Yoshida ............... 400/62 |

OTHER PUBLICATIONS

Turconi et al., "A Design Tool for Fault Tolerant Systems", IEEE, Proceedings Annual Reliability and Maintainability Symposium, 2000, pp. 317-326.

* cited by examiner

*Primary Examiner*—Dieu-Minh Le
(74) *Attorney, Agent, or Firm*—Francis Lammes; Stephen J. Walder, Jr.; Libby Z. Toub

(57) ABSTRACT

Determining an underlying cause for errors that are detected in the data processing system is performed. An occurrence of at least one error in the data processing system is detected, thereby forming a detected error. Responsive to detecting the detected error, a determination is made as to whether there is at least one previously recorded error in an error history data structure that is the underlying cause for the detected error. The at least one previously recorded error is related to the detected error and the at least one previously recorded error is of a different type from the detected error. Responsive to identifying the at least one previously recorded error, the at least one previously recorded error is reported to a user.

20 Claims, 3 Drawing Sheets

DETERMINING AN UNDERLYING CAUSE FOR ERRORS DETECTED IN A DATA PROCESSING SYSTEM

BACKGROUND OF THE INVENTION

1. Field of the Invention

The present application relates generally to an improved data processing system and method. More specifically, the present application is directed to determining an underlying cause for errors that are detected in a data processing system.

2. Background of the Invention

During an initial program load or a runtime of a data processing system, the data processing system may encounter an error which is analyzed by diagnostic firmware and results in a procedure to follow in order to rectify that problem or a recommendation for hardware replacement. One problem with providing the analysis is that the encountered error may be a side-effect of other problems not yet detected or may be related to errors detected earlier which the diagnostic firmware failed to keep a history of. For example, a defective memory buffer can lead to corrupted memory in dynamic random access memories (DRAMs) to which it is attached. However, depending on the order in which the diagnostic firmware checks for errors, the diagnostic firmware may be fooled into thinking that the DRAMs are the original source of errors, leading to more hardware replaced than was necessary, or missing the root cause altogether.

One known solution is diagnostic firmware that considers each error as an isolated independent event, provides an analysis for each error as if it was an isolated event, and creates an error log history. Then, in order to make a more precise analysis for the events that are related, an administrator or data processing system expert manually parses through the error log history and decides which error events point to the root cause and which may only be side-effects. This approach is not ideal, since manually parsing through an error log history depends on the expertise of the person performing the analysis, may be time consuming and tedious, and a complete error log history may not be always be available.

BRIEF SUMMARY OF THE INVENTION

In one illustrative embodiment, a method, in a data processing system, is provided for determining an underlying cause for errors that are detected in the data processing system. The illustrative embodiment detects an occurrence of at least one error in the data processing system, thereby forming a detected error. The illustrative embodiment determines if there is at least one previously recorded error in an error history data structure that is the underlying cause for the detected error in response to detecting the detected error. In the illustrative embodiments, the at least one previously recorded error is related to the detected error and the at least one previously recorded error is of a different type from the detected error. The illustrative embodiment reports the at least one previously recorded error to a user in response to identifying the at least one previously recorded error.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
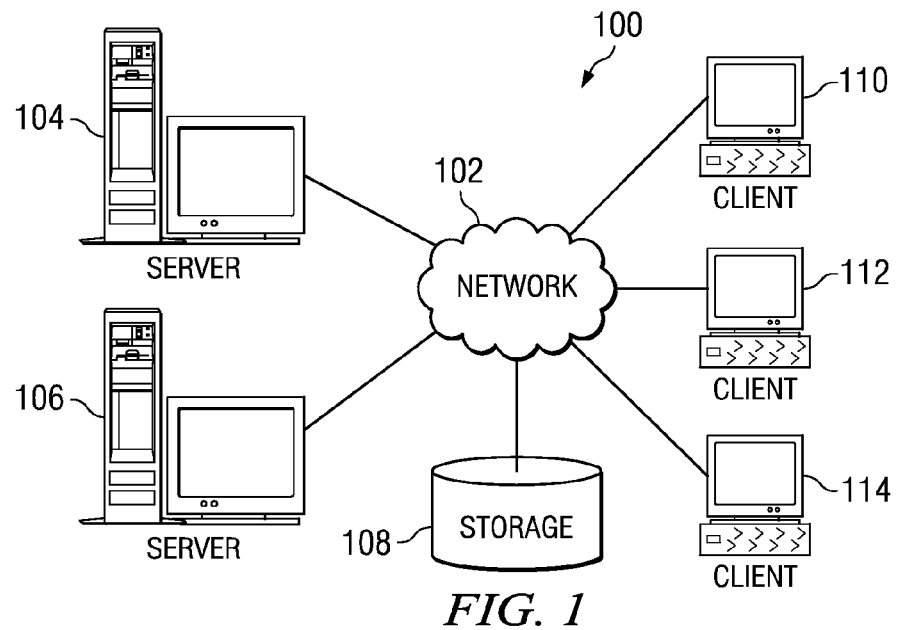
FIG. 1 is an exemplary representation of an exemplary distributed data processing system in which aspects of the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
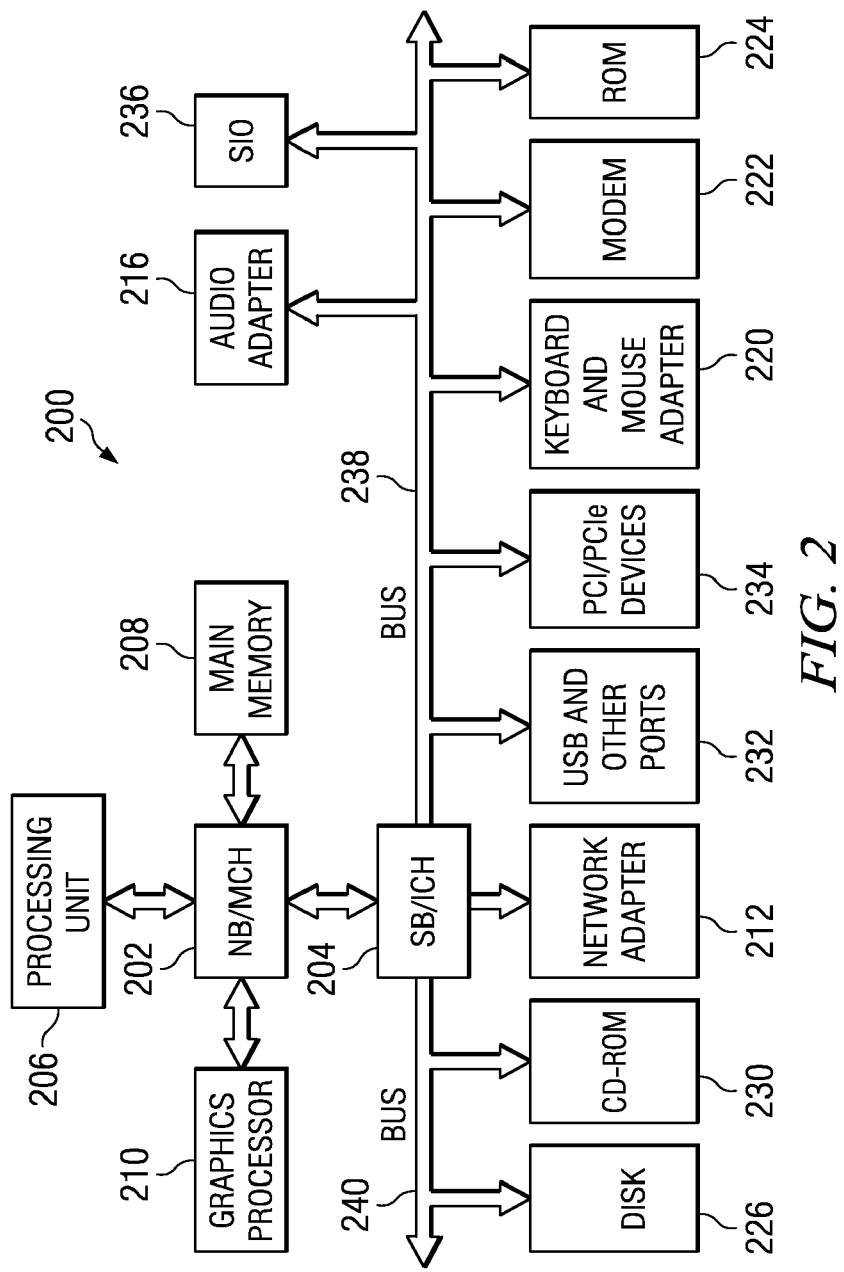
FIG. 2 is a block diagram of an exemplary data processing system in which aspects of the illustrative embodiments may be implemented.

The illustrative embodiments provide mechanisms for determining an underlying cause for errors that are detected in a data processing system. As such, the mechanisms of the illustrative embodiments are especially well suited for implementation within a distributed data processing environment and within, or in association with, data processing devices, such as servers, client devices, and the like. In order to provide a context for the description of the mechanisms of the illustrative embodiments, FIGS. 1-2 are provided hereafter as examples of a distributed data processing system, or environment, and a data processing device, in which, or with which, the mechanisms of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments provide for determining an underlying cause for errors that are detected in a data processing system. The illustrative embodiments create an error history data structure that records all of the errors that are detected by all diagnostic firmware. Then the next time an error is detected by the diagnostic firmware, either during initial program load or at runtime, error checking logic uses an error correlation data structure to check the error history data structure for previously detected errors that may be an underlying cause for the newly detected error. Initial program load may be generally used to describe the process of hardware power on, chip initialization, chip diagnostics, loading and starting the operating system, or the like. Then, rather than reporting the newly detected error, the error checking logic reports the underlying cause of the newly detected error.

Figure 3:
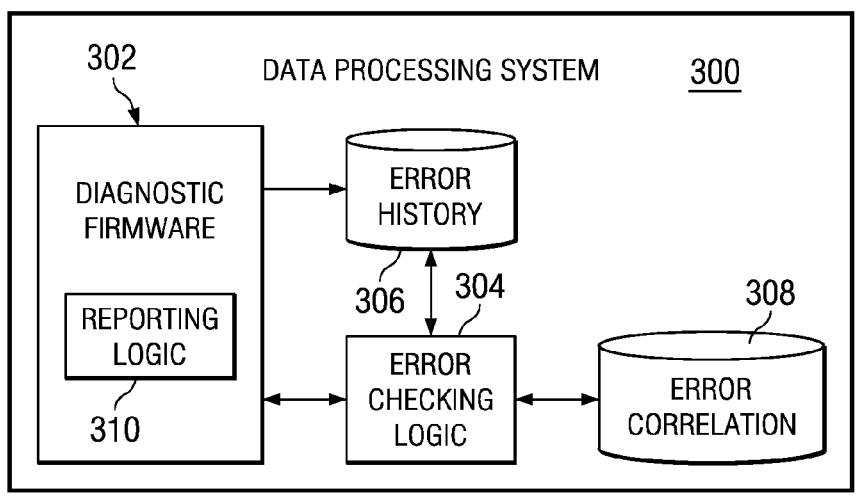
FIG. 3 illustrates the exemplary components of an error detection mechanism in accordance with an illustrative embodiment.

FIG. 3 illustrates the exemplary components of an error detection mechanism in accordance with an illustrative embodiment. In the illustrative embodiment, data processing system 300 may comprise diagnostic firmware 302 that is used to detect a failure within hardware, such as a memory device, memory subsystem, or any hardware within data processing system 300 that reports errors, and where the analysis of a group of errors over some time span may provide a better picture of root cause. By detecting a failure within the hardware, diagnostic firmware 302 may indicate to a high degree of certainty which hardware should be replaced, which may or may not be the hardware that is reporting the current error. In order to improve the accuracy of diagnostic firmware 302, the illustrative embodiments provide error checking logic 304 that assists diagnostic firmware 302 in determining if there is another error of a different type that is an underlying cause for an error that is detected during an initial program load or runtime.

As an application is loaded by an operating system in data processing system 300, diagnostic firmware 302 detects errors that may occur in the hardware of data processing system 300. If an error is detected, diagnostic firmware 302 logs the error in error history data structure 306 and signals error checking logic 304 that an error has been detected. Error checking logic 304 then uses an error correlation checklist, which is related to the detected error, that is stored in error correlation data structure 308 to correlate previously recorded errors of different types to the detected error in order to determine if there is an underlying cause for the detected error.

The error correlation information stored in error correlation data structure 308 provides, for each type of error that may be detected for each chip in data processing system 300, a checklist of related error conditions that should be considered prior to diagnostic firmware 302 reporting an error. Developers of data processing system 300 create a checklist for each type of error using error information that the developers are aware may occur in data processing system 300. Over time, as new errors are recognized by the developers, the checklists in error correlation data structure 308 may be updated so that the checklist include other related error conditions that should be considered prior to diagnostic firmware 302 reporting an error.

In addition to the checklists including related error conditions, the checklists may also include time period restrictions that restrict the time for which a previous error should be considered related to the newly detected error. Since error history data structure 306 may be preserved throughout the lifetime of data processing system 300, errors that have not occurred for a predetermined time period may not be considered as related errors. Furthermore, the checklist may also be prioritized based on multiple factors, such as cost of hardware replacement, ease of hardware replacement, probability of root cause, or the like.

Once error checking logic 304 retrieves the checklist related to the detected error from error correlation data structure 308, error checking logic 304 checks error history data structure 306 for any related error conditions listed in the checklist that should be considered prior to diagnostic firmware 302 reporting an error. For example, error history data structure 306 may be comprised of:

a. a time-stamped list of previous memory uncorrectable errors (UEs) and their location in memory, detected by a memory controller (MC),
b. a time-stamped list of previous memory correctable errors (CEs) and their location in memory, detected by the MC,
c. a time-stamped list of previous errors pointing to a logic fault within the MC itself,
d. a time-stamped list of previous MC-memory buffer (MB) bus errors,
e. a time-stamped list of previous errors pointing to a logic fault within a MB itself,
f. a time-stamped list of previous errors on the MB-dynamic random access memory (DRAM) command/address bus,
g. a time-stamped list of previous clock glitches in the memory subsystem,
h. a time-stamped list of previous power glitches in the memory subsystem, and/or
i. a time-stamped list of previous over-temperature conditions reported in the memory subsystem.

Error checking logic 304 may check error history data structure 306 for any related error conditions listed in the checklist that should be considered prior to diagnostic firmware 302 reporting the detected error by performing one or more of the following checks:

a. check for over-temperature conditions in past x time units or other predetermined past time period,
b. check for power glitches in past x time units or other predetermined past time period,
c. check for clock glitches in past x time units or other predetermined past time period,
d. check for internal MB logic errors in past x time units or other predetermined past time period,
e. check for MB-DRAM command/address bus errors in past x time units or other predetermined past time period or other predetermined past time period,
f. check for MC-MB bus errors in past x time units or other predetermined past time period,
g. check for internal MC logic errors in past x time units or other predetermined past time period, and/or
h. check for memory CEs/UEs in same region of memory in past x time units or other predetermined past time period.

One illustrative method of checking for a related error condition listed in the checklist that should be considered prior to reporting the detected error may be stepping down the checklist in order, stopping at first condition that provides a positive response, and identifying that condition as a root cause of the error being diagnosed. For example, if error checking logic 304 determines that the detected error has a related error condition identified as a power glitch, all other related conditions listed in the checklist may be expected side-effects, therefore, there may be no point in any further analysis of the checklist. However, error checking logic 304 may be required to consider multiple items in the checklist before arriving at a conclusion of a root cause. For example, before error checking logic 304 concludes that a power glitch may be the root cause of the detected error, error checking logic 304 may be required to confirm the existence of other expected side-effects, such as clock glitches, bus errors, or the like.

If error checking logic 304 determines there is a more serious root cause for the detected error, then error checking logic 304 signals reporting logic 310 within diagnostic firmware 302 of the more serious root cause of the error. Reporting logic 310 then reports the more serious root cause of the detected error to the user and/or administrator of data processing system 300.

If error checking logic 304 fails to determine a more serious root cause for the detected error, then error checking logic 304 signals diagnostic firmware 302 to determine if the detected error is recoverable through hardware. If diagnostic firmware 302 determines that the detected error is not recoverable through hardware, reporting logic 310 reports the detected error to the user and/or administrator of data processing system 300. If diagnostic firmware 302 determines if the detected error is recoverable through hardware, then diagnostic firmware 302 recovers the detected hardware through the assistance of hardware, firmware, a combination of hardware and firmware, or the like. For example, memory correctable errors may be recoverable using hardware with no firmware assistance. That is, most errors considered recoverable are recovered automatically by the hardware. However, some errors, such as a soft parity error in a register, may be recoverable through hardware, but only with firmware assistance. That is, the firmware may just re-write a correct value back to the register.

Even if the error is recoverable through hardware, diagnostic firmware 302 determines, using predetermined reporting procedures, if the detected error should be reported to the user and/or administrator of data processing system 300. If the predetermined reporting procedures indicate that the detected error should be reported, then reporting logic 310 reports the detected error to the user and/or administrator of data processing system 300. If the predetermined reporting procedures indicate that the detected error should not be reported, then diagnostic firmware 302 continues to check for errors that may occur in the hardware of data processing system 300.

Thus, the illustrative embodiments use a checklist to analyze all errors that have occurred in a data processing system in order to determine if there is an underlying cause for a detected error. If a more serious root cause for the detected error is identified, the more serious root problem is reported to the user and/or administrator of the data processing system.

Figure 4:
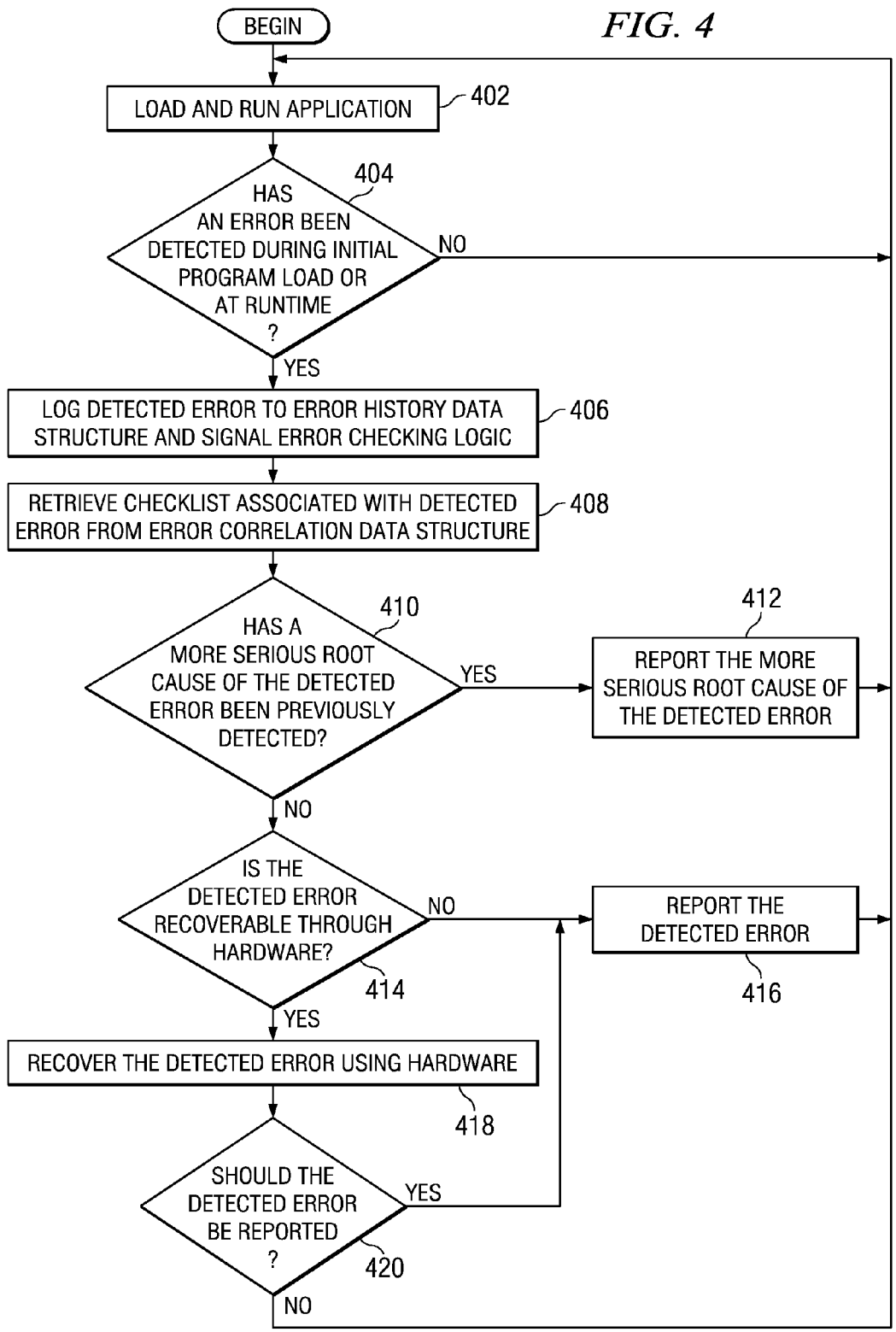
FIG. 4 illustrates the exemplary operation of an error detection mechanism in accordance with an illustrative embodiment.

FIG. 4 illustrates the exemplary operation of an error detection mechanism in accordance with an illustrative embodiment. As the operation begins, an operating system loads and/or runs an application (step 402). As the application is loaded and/or run, the diagnostic firmware of the data processing system detects any errors that may occur in the hardware of the data processing system (step 404). If at step 404 the diagnostic firmware fails to detect an error, the operation returns to step 402. If at step 404 the diagnostic firmware detects an error, the diagnostic firmware logs the error in an error history data structure and signals error checking logic within the data processing system that an error has been detected (step 406).

The error checking logic then retrieves an error correlation checklist associated with the detected error stored from an error correlation data structure (step 408). Using the checklist, the error checking logic determines if there is a previously recorded error that is an underlying cause for the detected error (step 410). If at step 410 the error checking logic determines there is a more serious root cause for the detected error, then the error checking logic signals reporting logic within the diagnostic firmware to report the more serious root cause of the detected error to the user and/or administrator of the data processing system (step 412), with the operation returning to step 402 thereafter.

If at step 410 the error checking logic fails to determine a more serious root cause for the detected error, then the error checking logic signals the diagnostic firmware to determine if the detected error is recoverable through hardware (step 414). If at step 414 the diagnostic firmware determines that the detected error is not recoverable through hardware, then the reporting logic reports the detected error to the user and/or administrator of the data processing system (step 416), with the operation returning to step 402 thereafter. If the diagnostic firmware determines if the detected error is recoverable through hardware, firmware, a combination of hardware and firmware, or the like, then the diagnostic firmware recovers the detected hardware (step 418).

Even if the error is recoverable through hardware at step 418, the diagnostic firmware determines, using predetermined reporting procedures, if the detected error should be reported to the user and/or administrator of the data processing system (step 420). If at step 420 the diagnostic firmware determines, using the predetermined reporting procedures, that the detected error should be reported, then the operation proceeds to step 416 where the reporting logic reports the detected error to the user and/or administrator of data processing system. If at step 420 the diagnostic firmware determines, using the predetermined reporting procedures, that the detected error should not be reported, then the operation returns to step 402.

Thus, the illustrative embodiments provide for determining an underlying cause for errors that are detected in a data processing system. The illustrative embodiments create an error history data structure that records all of the errors that are detected by all diagnostic firmware. Then the next time an error is detected by the diagnostic firmware, either during initial program load or at runtime, error checking logic uses an error correlation data structure to check the error history data structure for previously detected errors that may be an underlying cause for the newly detected error. Then, rather than reporting the newly detected error, the error checking logic reports the underlying cause of the newly detected error.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for determining an underlying cause for errors that are detected in the data processing system, the method comprising:

detecting an occurrence of at least one error in the data processing system, thereby forming a detected error;

responsive to detecting the detected error, determining if there is at least one previously recorded error in an error history data structure that is the underlying cause for the detected error, wherein the at least one previously recorded error is related to the detected error and wherein the at least one previously recorded error is of a different type from the detected error; and responsive to identifying the at least one previously recorded error, reporting the at least one previously recorded error to a user.

2. The method of claim 1, wherein determining if there is the at least one previously recorded error in the error history data structure that is the underlying cause for the detected error comprises:
  retrieving an error correlation checklist for the detected error;
  determining if one of a plurality of previously recorded errors in the error history data structure is the underlying cause of the detected error using the error correlation checklist; and
  responsive to identifying the at least one previously recorded error from the plurality of previously recorded errors that is the underlying cause of the detected error, reporting the at least one previously recorded error to the user.

3. The method of claim 1, further comprising:
  responsive to a failure to identify the at least one previously recorded error, determining if the detected error is recoverable; and
  responsive to the detected error failing to be recoverable, reporting the detected error to the user.

4. The method of claim 3, further comprising:
  responsive to the detected error being recoverable, recovering the detected error thereby forming a recoverable error;
  determining if the recoverable error is to be reported to the user; and
  responsive to the recoverable error needing to be reported, reporting the recoverable error to the user.

5. The method of claim 4, wherein the detected error is recoverable through at least one of hardware, firmware, or a combination of hardware and firmware.

6. The method of claim 1, further comprising:
  responsive to detecting the at least one error, logging the at least one error in the error history data structure.

7. The method of claim 1, wherein the at least one error occurred in hardware of the data processing system.

8. The method of claim 1, wherein the error correlation checklist is retrieved from an error correlation data structure.

9. The method of claim 1, where the error history data structure comprises at least one of:
  a time-stamped list of previous memory uncorrectable errors (UEs) and a location of the UEs in a memory;
  a time-stamped list of previous memory correctable errors (CEs) and a location of the CEs in the memory;
  a time-stamped list of previous errors pointing to a logic fault within a memory controller (MC);
  a time-stamped list of previous MC-memory buffer (MB) bus errors;
  a time-stamped list of previous errors pointing to a logic fault within the MB;
  a time-stamped list of previous errors on a memory bus (MB)-dynamic random access memory (DRAM) command/address bus;
  a time-stamped list of previous clock glitches in a memory subsystem;
  a time-stamped list of previous power glitches in the memory subsystem; or
  a time-stamped list of previous over-temperature conditions reported in the memory subsystem.

10. The method of claim 2, wherein the error correlation checklist identifies a list of checks that are to be performed and where the list of checks comprises at least one of a:
  check for over-temperature conditions for a past predetermined time period;
  check for power glitches for the past predetermined time period;
  check for clock glitches for the past predetermined time period;
  check for internal MB logic errors for the past predetermined time period;
  check for MB-DRAM command/address bus errors for the past predetermined time period;
  check for MC-MB bus errors for the past predetermined time period;
  check for internal MC logic errors for the past predetermined time period; or
  check for memory CEs/UEs in same region of memory for the past predetermined time period.

11. A computer program product comprising a computer recordable storage medium having a computer readable program recorded thereon, wherein the computer readable program, when executed on a computing device, causes the computing device to:
  detect an occurrence of at least one error in the data processing system, thereby forming a detected error;
  responsive to detecting the detected error, determine if there is at least one previously recorded error in an error history data structure that is the underlying cause for the detected error, wherein the at least one previously recorded error is related to the detected error and wherein the at least one previously recorded error is of a different type from the detected error; and
  responsive to identifying the at least one previously recorded error, report the at least one previously recorded error to a user.

12. The computer program product of claim 11, wherein the computer readable program to determine if there is the at least one previously recorded error in the error history data structure that is the underlying cause for the detected error further comprises computer readable program that causes the computing device to:
  retrieve an error correlation checklist for the detected error;
  determine if one of a plurality of previously recorded errors in the error history data structure is the underlying cause of the detected error using the error correlation checklist; and
  responsive to identifying the at least one previously recorded error from the plurality of previously recorded errors that is the underlying cause of the detected error, report the at least one previously recorded error to the user.

13. The computer program product of claim 11, wherein the computer readable program further causes the computing device to:
  responsive to a failure to identify the at least one previously recorded error, determine if the detected error is recoverable; and
  responsive to the detected error failing to be recoverable, report the detected error to the user.

14. The computer program product of claim 13, wherein the computer readable program further causes the computing device to:
  responsive to the detected error being recoverable, recover the detected error thereby forming a recoverable error;
  determine if the recoverable error is to be reported to the user; and
  responsive to the recoverable error needing to be reported, report the recoverable error to the user.

15. The computer program product of claim 11, wherein the computer readable program further causes the computing device to:
  responsive to detecting the at least one error, log the at least one error in the error history data structure.

16. An apparatus, comprising:
a processor; and
a memory coupled to the processor, wherein the memory comprises instructions which, when executed by the processor, cause the processor to:
detect an occurrence of at least one error in the data processing system, thereby forming a detected error;
responsive to detecting the detected error, determine if there is at least one previously recorded error in an error history data structure that is the underlying cause for the detected error, wherein the at least one previously recorded error is related to the detected error and wherein the at least one previously recorded error is of a different type from the detected error; and
responsive to identifying the at least one previously recorded error, report the at least one previously recorded error to a user.

17. The apparatus of claim 16, wherein the instructions to determine if there is the at least one previously recorded error in the error history data structure that is the underlying cause for the detected error further cause the processor to:
retrieve an error correlation checklist for the detected error;
determine if one of a plurality of previously recorded errors in the error history data structure is the underlying cause of the detected error using the error correlation checklist; and
responsive to identifying the at least one previously recorded error from the plurality of previously recorded errors that is the underlying cause of the detected error, report the at least one previously recorded error to the user.

18. The apparatus of claim 16, wherein the instructions further cause the processor to:
responsive to a failure to identify the at least one previously recorded error, determine if the detected error is recoverable; and
responsive to the detected error failing to be recoverable, report the detected error to the user.

19. The apparatus of claim 18, wherein the instructions further cause the processor to:
responsive to the detected error being recoverable, recover the detected error thereby forming a recoverable error;
determine if the recoverable error is to be reported to the user; and
responsive to the recoverable error needing to be reported, report the recoverable error to the user.

20. The apparatus of claim 16, wherein the instructions further cause the processor to:
responsive to detecting the at least one error, log the at least one error in the error history data structure.

* * * * *